United States Patent
Yamada

[19]
[11] Patent Number: 5,960,726
[45] Date of Patent: Oct. 5, 1999

[54] EMBROIDERY DATA PROCESSOR

[75] Inventor: Kenji Yamada, Nagoya, Japan

[73] Assignee: Brother Kogyo Kabushiki Kaisha, Nagoya, Japan

[21] Appl. No.: 09/146,668

[22] Filed: Sep. 3, 1998

[30]    Foreign Application Priority Data

Sep. 5, 1997  [JP]  Japan .................................. 9-240649

[51] Int. Cl.$^6$ ............................... D05C 5/06; G06F 19/00
[52] U.S. Cl. .................................. 112/102.5; 112/475.19; 364/470.09
[58] Field of Search ........................... 112/102.5, 470.04, 112/470.06, 475.05, 475.19; 364/470.09, 470.07

[56]    References Cited

U.S. PATENT DOCUMENTS

| | | | |
|---|---|---|---|
| 4,413,574 | 11/1983 | Hirota et al. . | |
| 4,991,524 | 2/1991 | Ozaki | 112/102.5 |
| 5,499,589 | 3/1996 | Kyuno et al. . | |
| 5,791,271 | 8/1998 | Futamura | 112/102.5 |
| 5,794,553 | 8/1998 | Futamura | 112/102.5 |

*Primary Examiner*—Peter Nerbun
*Attorney, Agent, or Firm*—Oliff & Berridge, PLC

[57]    ABSTRACT

Image data is retrieved step S1 by an image scanner from an original image desired to be sewn. In step S3, a user selects one image region, where stitches are desired to be sewn in a single direction, from the retrieved image data. Texture characteristic data is then calculated in step S4 for the selected region. In step S7, the image data of each selected region is divided into a plurality of stitch zones, and stitch data is produced for each stitch zone.

22 Claims, 8 Drawing Sheets

EMBROIDERY DATA PROCESSOR

BACKGROUND OF THE INVENTION

1. Field of the Invention

The present invention relates to an embroidery data processor for processing embroidery stitch data for forming embroidery stitches based on optional images.

2. Description of Related Art

There has been proposed an embroidery data production device of a type which can produce embroidery data based on any desired images. With using this embroidery data production device, the user scans his/her desired image using an image scanner, to thereby input image data representing the scanned image into the embroidery data production device. Based on the inputted image data, the embroidery data production device determines contours of patterns expressed in the image, and determines several closed regions residing in the inputted image. The embroidery data production device then produces embroidery stitch data based on data of the determined contours and closed regions. The embroidery stitch data indicates positions where stitches are to be sewn in each closed region.

SUMMARY OF THE INVENTION

It is noted that there are some images that have their own specific patterns in the inside of their closed regions. More specifically, there are some images that have their own textures or visual surface characteristics in the inside of their closed regions.

FIG. 7 shows an example of those images. This flower image A has: a closed region A1 for a flower center; five closed regions A2–A6 for flower petals; a curved line region A7 for a stem; and a pair of closed regions A8 and A9 for leaves. In this flower image A, the flower center region A1 has its own texture in its inside area. That is, a plurality of horizontal lines are formed inside the region A1. Each of the flower petal regions A2–A6 also has its own texture. That is, a plurality of lines are formed inside each flower petal region A2–A6. Those lines extend radially outwardly from the flower center region A1.

In order to sew, on a cloth, an embroidery to reproduce the flower image A, it is conceivable to prepare embroidery stitch data so that the inside area of each region A1–A9 will be filled with thread stitches of a corresponding single color. In this case, it is desirable to prepare embroidery stitch data for the flower center region A1 and the flower petal regions A2–A6 so that thread stitches will be formed on the cloth to reproduce the textures appearing inside of those regions. More specifically, it is desirable to prepare embroidery stitch data for the region A1 so that thread stitches will be arranged on the cloth with each thread stitch extending horizontally, that is, along the lines residing therein. It is also desirable to prepare embroidery stitch data for each region A2–A6 so that thread stitches will be arranged on the cloth with each thread stitch extending along the lines residing therein, that is, radially outwardly from the flower center A1.

The above-described conventional embroidery data production device, however, determines stitch directions of embroidery stitch data not based on the texture characteristic of the original image. Accordingly, when the user desires to produce an embroidery whose constituent stitches can properly express the texture in the original image, the user has to perform a special manual operation to set his/her desired stitch direction.

It is conceivable to automatically set the stitch direction in a manner described below. First, lengths in longitudinal and latitudinal directions of a closed region under consideration are compared. Then, embroidery stitch data is prepared for the subject region to extend along the direction of the shorter length. However, this conceivable method still fails to determine the direction of the stitches based on the texture characteristics residing in the inside area of the closed region.

It is therefore an objective of the present invention to overcome the above-described problems and to provide an improved embroidery data processor which can produce embroidery stitch data based on original image data while determining directions of the thread stitches based on the texture or pattern characteristics residing in the inside area of the original image.

In order to attain the above and other objects, the present invention provides an embroidery data processing device for processing embroidery stitch data for forming embroidery stitches based on a desired pattern image, the embroidery data processor comprising: image input means for inputting an image desired to be sewn as an embroidery; texture calculation means for determining a texture characteristic of the inputted image; and stitch format setting means for setting a stitch format, in which stitches are to be formed to reproduce the input image, based on the determined texture characteristic. The texture calculation means may automatically calculate the texture characteristic indicative of a characteristic of a texture appearing in the inputted image.

The embroidery data processing device may further comprise stitch data production means for producing embroidery stitch data indicative of stitches to be sewn in the determined stitch format. The stitch format setting means may set, based on the determined texture characteristic, a stitch direction, in which stitches are to be formed to extend to reproduce the texture of the input image, the stitch data production means producing embroidery stitch data indicative of stitches to be sewn to extend in the determined stitch direction.

According to another aspect, the present invention provides a sewing machine capable of sewing an embroidery based on a desired pattern image, the sewing machine comprising: image input means for inputting an image desired to be sewn as an embroidery; texture calculation means for automatically determining a texture characteristic of the inputted image; stitch format setting means for setting a stitch format based on the determined texture characteristic; stitch data production means for producing embroidery stitch data indicative of stitches to be sewn in the determined stitch format; and sewing means for sewing an embroidery based on the produced embroidery stitch data.

According to still another aspect, the present invention provides a method for processing embroidery stitch data for forming embroidery stitches based on a desired pattern image, the method comprising the steps of: inputting an image desired to be sewn as an embroidery; determining a texture characteristic of the inputted image; and setting a stitch format, in which stitches are to be formed to reproduce the input image, based on the determined texture characteristic. The texture determining step may calculate the texture characteristic indicative of a characteristic of a texture appearing in the inputted image.

According to another aspect, the present invention provides a data storage medium storing data of a program for processing embroidery stitch data for forming embroidery stitches based on a desired pattern image, the data storage medium being capable of being read by a computer, the program comprising programs of: inputting an image desired to be sewn as an embroidery; determining a texture characteristic of the inputted image; and setting a stitch format, in which stitches are to be formed to reproduce the input image, based on the determined texture characteristic.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENT

An embroidery data processor according to a preferred embodiment of the present invention will be described while referring to the accompanying drawings.

The embroidery data processor 1 of the present embodiment is provided for receiving images of patterns, for converting the inputted images into embroidery stitch data, and then for recording the embroidery stitch data onto a non-volatile and rewritable memory card (flash-memory card) 11. The flash-memory card 11 is provided with a flash-memory such as an EEPROM (electrically erasable and programmable read only memory). The memory card 11 is for being mounted in a household embroidery sewing machine 140 so that the sewing machine 140 will be controlled based on the embroidery stitch data stored in the memory card 11.

Figure 1:
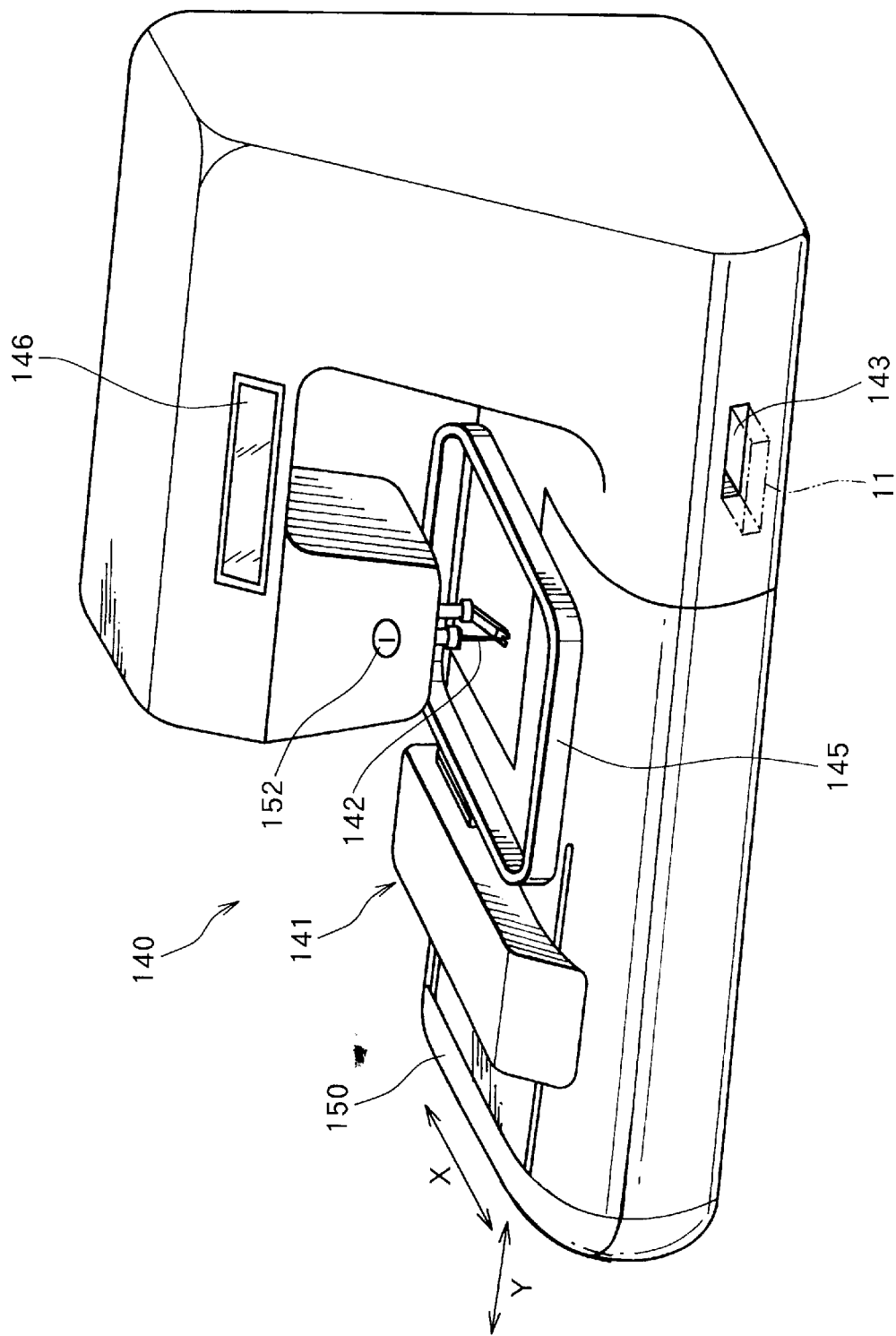
FIG. 1 is a perspective view of an embroidery sewing machine for automatically forming an embroidery on a work sheet by utilizing embroidery stitch data produced according to an embroidery data processing device of an embodiment of the present invention.

First, the household embroidery sewing machine 140 will be described below with reference to FIGS. 1 and 2.

The embroidery sewing machine 140 is provided with a memory card device 143, in which can be mounted the non-volatile rewritable memory card 11 stored with embroidery stitch data. The memory card device 143 is for retrieving the stitch data from the memory card 11.

The embroidery sewing machine 140 includes a bed portion 150 and an embroidery frame 145 disposed above the bed 150. The embroidery frame 145 is for supporting a workpiece cloth in which embroidery is desired to be sewn. The embroidery sewing machine 140 also includes a horizontal movement mechanism 141 for moving the embroidery frame 145 based on the stitch data retrieved from the memory card 11. The stitch data indicates stitch positions, that is, movement amounts of the embroidery frame 145 with respect to an X–Y coordinate system defined for the embroidery sewing machine 140. By supplying stitch data from the memory card 11 to the embroidery sewing machine 140, the horizontal movement mechanism 141 moves the embroidery frame 145 to desired stitch positions. The embroidery sewing machine 140 also includes: a sewing needle 142 for conveying a color embroidery thread (not shown) that is changeable by a user with a different thread having a different color; and a loop taker mechanism (not shown) disposed under the bed 150 for taking a loop of the thread conveyed by the needle 142.

Sewing operations are performed by using the horizontal movement mechanism 141 to move the embroidery frame 145 to desired positions and also controlling the sewing needle 142 and the loop taker to sew embroidery onto the workpiece cloth in the embroidery frame 145.

The sewing machine 140 is further provided with a display portion 146 for displaying a variety of different messages directed to a user. For example, the display portion 146 displays a message requesting the user to change the current needle thread with a new thread having a different color from that of the current thread. The sewing machine 140 is further provided with an embroidery start button 152 for commanding start of embroidery sewing processes.

Figure 2:
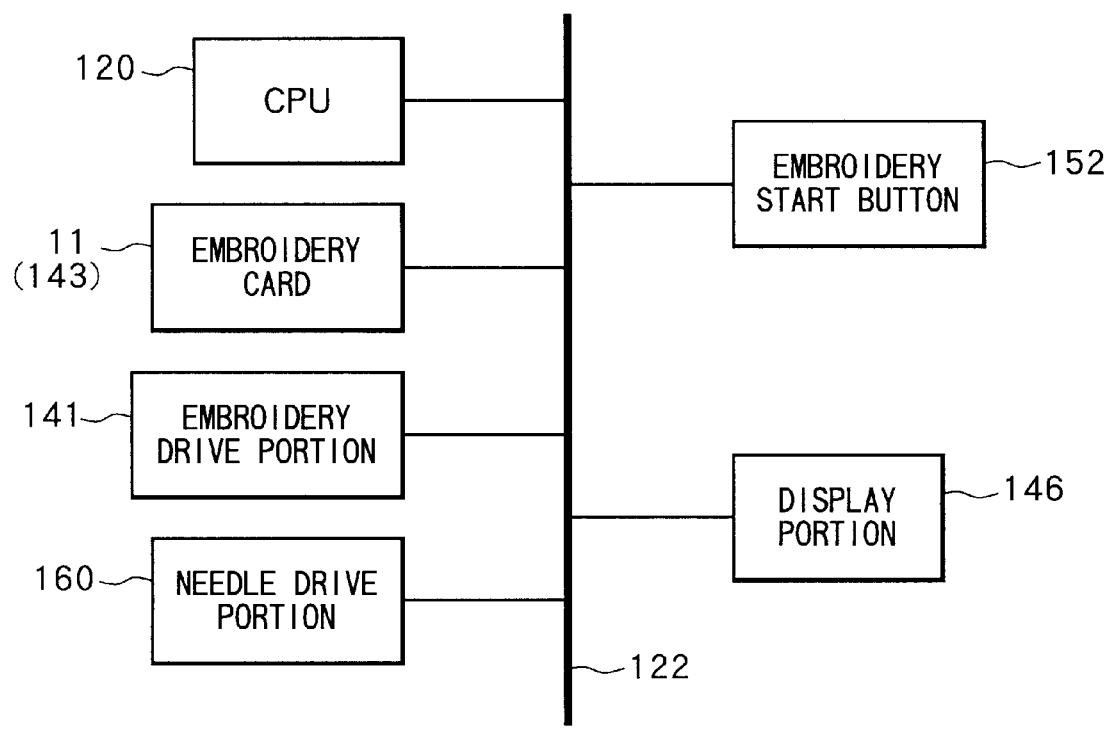
FIG. 2 is a block diagram of a control portion provided in the sewing machine of FIG. 1.

As shown in FIG. 2, the embroidery sewing machine 140 is provided with a control portion. The control portion is constructed from a microcomputer internally disposed in the sewing machine 140. More specifically, a CPU 120 is provided for controlling a variety of operations. The CPU 120 is connected, via a bus 122, to a needle drive portion 160 for driving the needle 142 and the loop taker, and to the embroidery card 11 mounted in the card mounting portion 143, the display portion 146, the embroidery drive portion 141, and the embroidery start button 152. The CPU 120 controls the horizontal movement mechanism 141 and the needle drive portion 160 based on the stitch data retrieved from the memory card 11, thereby to automatically perform embroidery operations.

The embroidery data processor 1 according to the present embodiment is for producing embroidery stitch data to be stored in the memory card 11 and to be used in the above-described embroidery sewing machine 140.

The embroidery data processed by the data processor 1 include a successive sets of stitch-position data (e.g., X and Y coordinate data) which represent respective stitch positions where the sewing needle 142 penetrates the work piece to form corresponding stitches. Each set of stitch-position data represents respective amounts of movement of the embroidery frame 145 or the work piece along the X and Y axes to form a corresponding stitch. Each set of stitch-position data therefore determines a direction, in which a corresponding thread stitch, to be left on the cloth surface, will extend.

Figure 3:
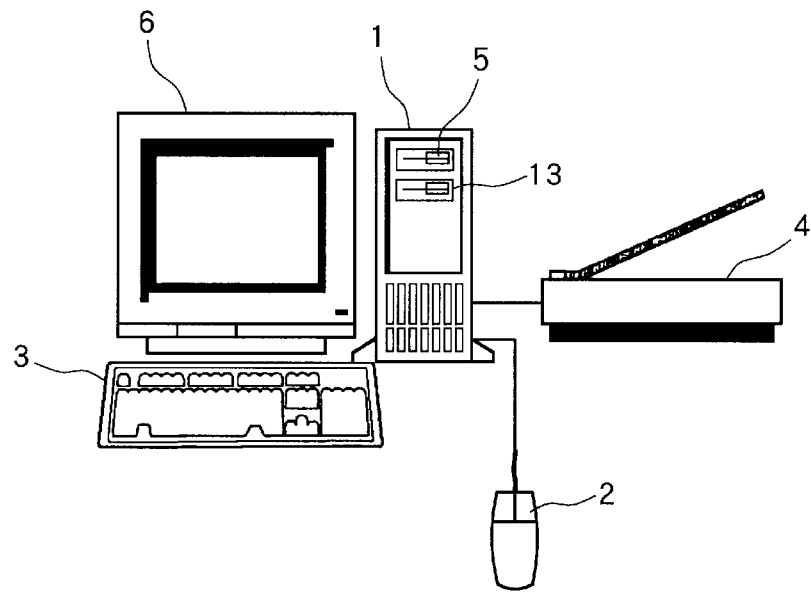
FIG. 3 is an external view of the embroidery data processing device of the embodiment of the present invention.

FIG. 3 is an external front view of the embroidery data processor 1 according to the present embodiment. The embroidery data processor 1 is electrically connected to a mouse 2, a keyboard 3, an image scanner 4, and a display device 6. The embroidery data processor 1 is provided with a memory card connector 5. The data processor 1 is further provided with an external storage device 13 such as a floppy disk drive, in which can be mounted a data storage medium 14.

Figure 4:
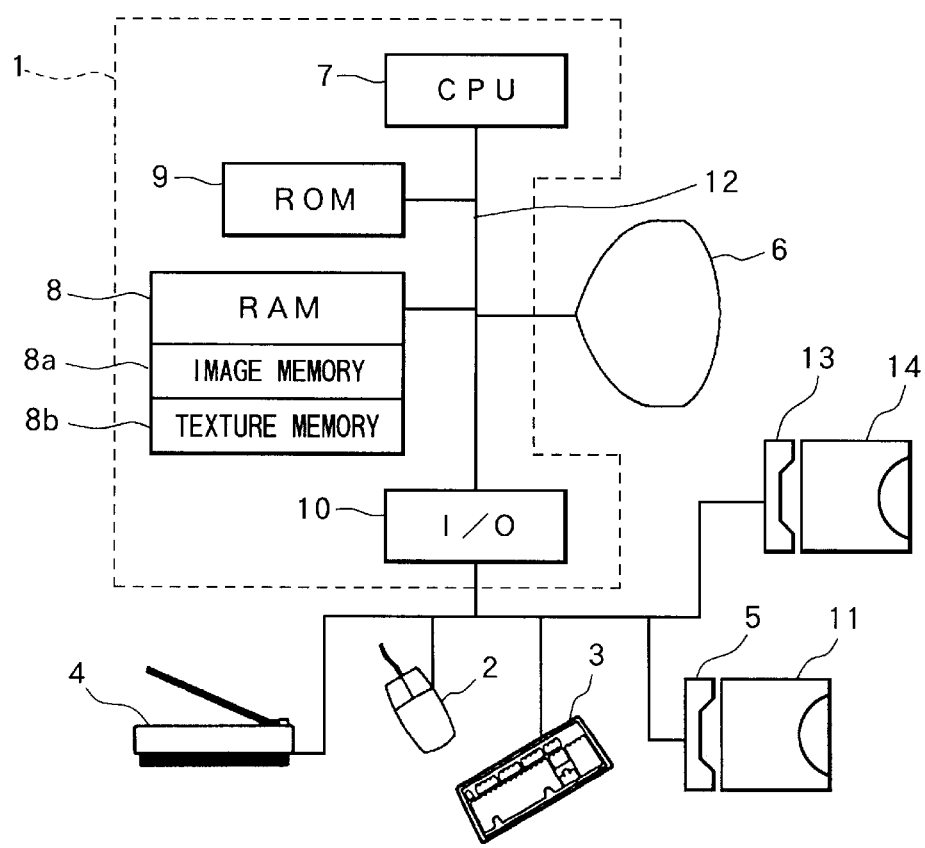
FIG. 4 is a block diagram of a control portion provided in the embroidery data processing device of FIG. 3.

FIG. 4 is a block diagram showing an electrical control structure of the embroidery data processor 1.

As shown in FIG. 4, the embroidery data processor 1 includes a CPU 7, a RAM 8, a ROM 9, and an input/output interface 10, which are connected with one another via a bus line 12. The embroidery data processor 1 is connected, via the input/output interface 10, to the mouse 2, the keyboard 3, the image scanner 4, the memory card connector 5, and the external storage device 13. The display device 6 is connected to the bus line 12.

The image scanner 4 is for scanning an original image desired to be sewn as an embroidery and for producing image data indicative of the scanned original image. The image scanner 4 is designed as capable of retrieving image data from any original images such as a photograph, a hand drawn figure, and the like. The image scanner 4 may be of any scanning types such as a raster-type or a bit-map type. Accordingly, the image scanner 4 may produce any types of image data such as raster-type digital image data or bit-map data containing a plurality of sets of picture-element data corresponding to a number of picture elements constituting the original image. Each set of picture-element data may be constituted from a set of one-bit data representing a bi-level density or a set of eight-bit data, for example, representing multilevel density.

The image scanner 4 may be designed as a monochromatic image scanner capable of retrieving image data from any black and white images. Or, the image scanner 4 may be designed as a full color image scanner capable of retrieving full color image data from any full color images. When the image scanner 4 is of the full color type, the image scanner 4 produces image data for each of predetermined three primary color components.

Figure 5:
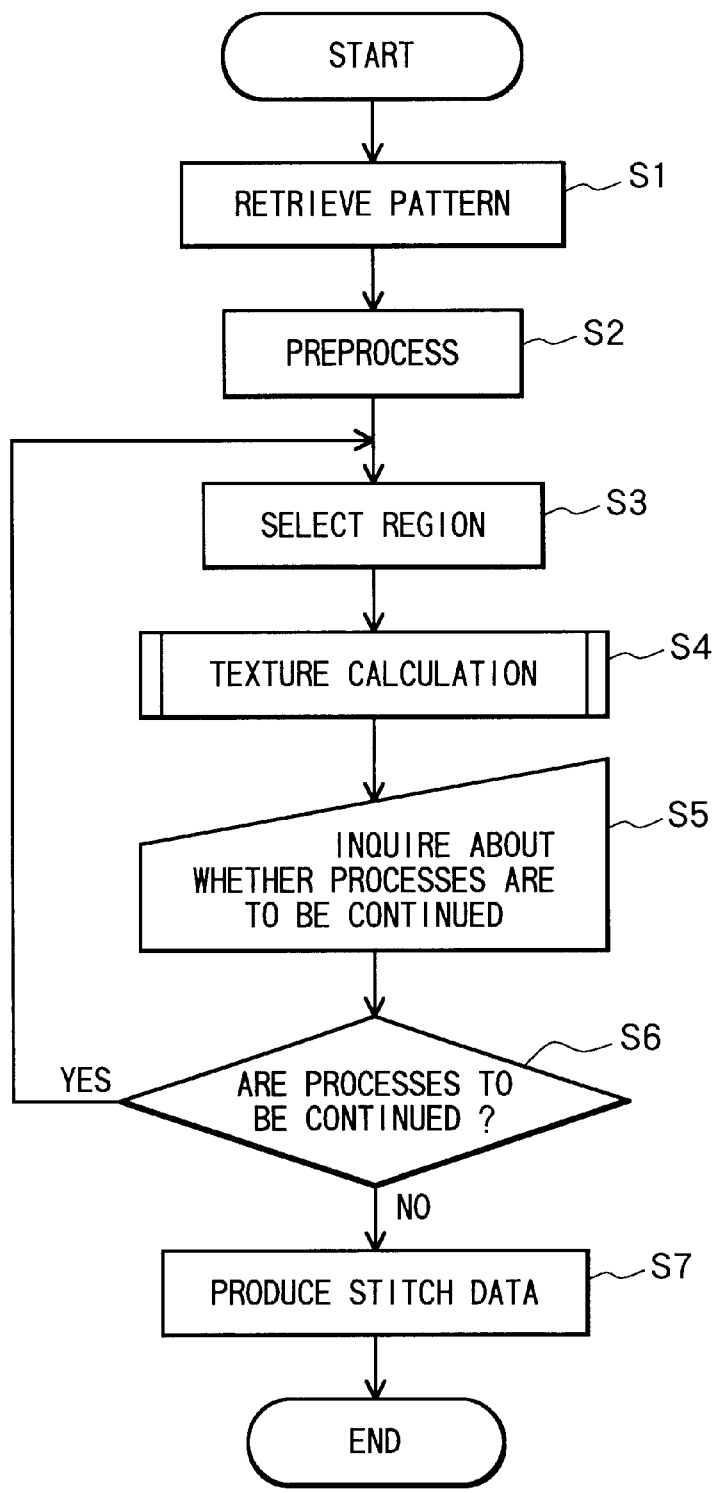
FIG. 5 is a flowchart of an embroidery stitch data production process employed by the embroidery data processing device.
Figure 6:
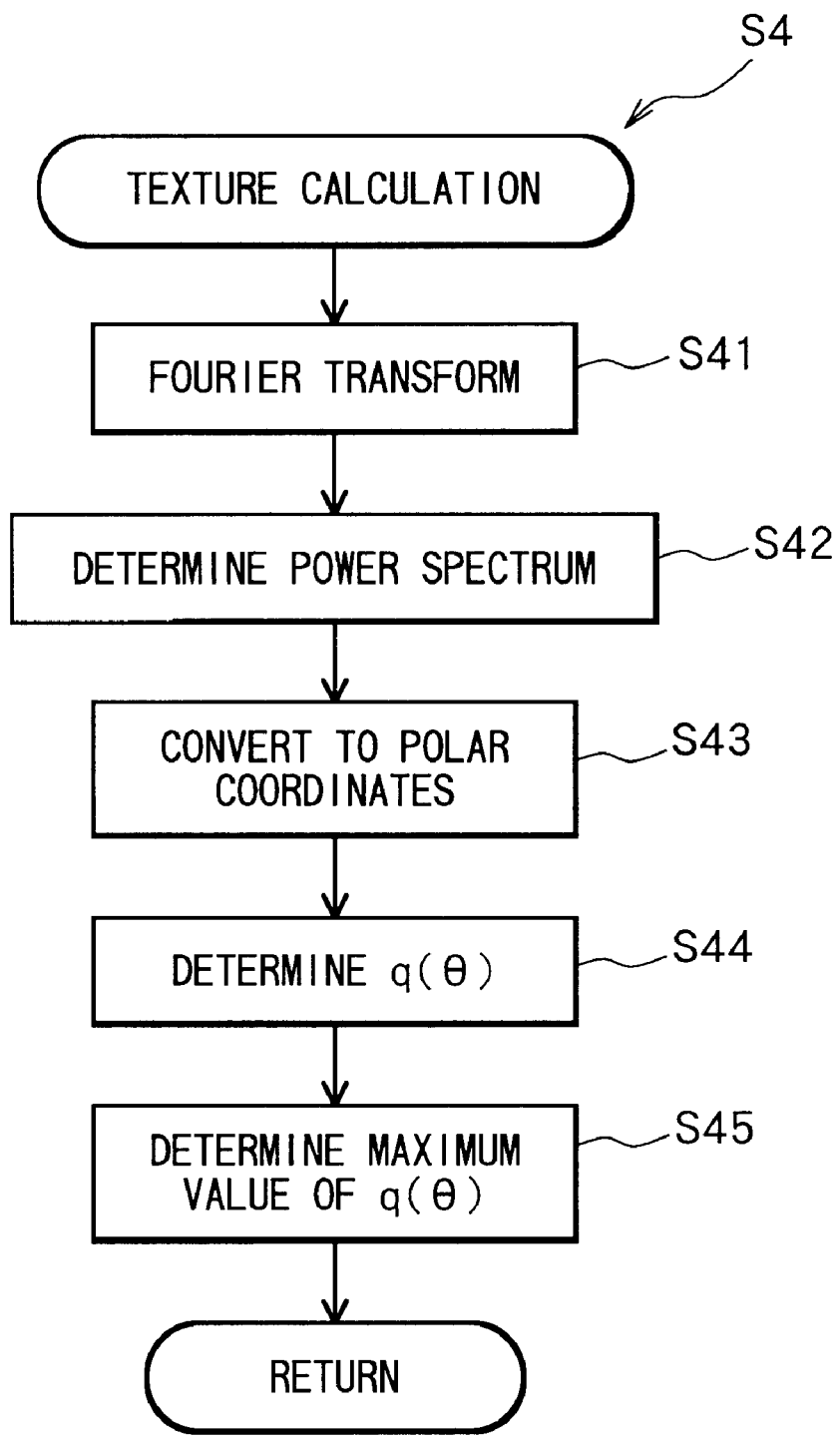
FIG. 6 is a flowchart of a texture characteristic extraction process in the process of FIG. 5.

The ROM 9 is prestored with data of an embroidery stitch data production process shown in FIGS. 5 and 6. The ROM 9 is prestored with data of other various control programs. The ROM 9 is further prestored with data of several parameters for being used during the processes of FIGS. 5 and 6. For example, the ROM 9 prestores therein predetermined stitch format parameters. Representative examples of the stitch format parameters include: an appropriate stitch density, with which thread stitches are to be arranged on the cloth; and an appropriate stitch type, such as tatami stitches, satin stitches, etc, at which thread stitches are to be sewn on the cloth.

The RAM 8 is formed with an original image memory region 8a for temporarily storing image data produced by and supplied from the image scanner 4. The RAM 8 is also formed with a memory region for storing various values calculated by the CPU 7 during the stitch data production process of FIGS. 5 and 6. For example, the RAM 8 is formed with a texture characteristic memory region 8b for temporarily storing a texture characteristic value θ' (described later) calculated by the CPU 7 during the stitch data production process of FIGS. 5 and 6.

The memory card connector 5 is for mounting the memory card 11 desired to be written with embroidery stitch data, which is produced by the embroidery data processor 1 during the stitch data production process of FIGS. 5 and 6. The memory card connector 5 is for recording the embroidery stitch data on the memory card 11.

The mouse 2 and the keyboard 3 are for enabling a user to input his/her commands and instructions. The display device 6 such as a CRT display is for displaying various messages and various screens.

The CPU 7 is for performing entire control operation of the embroidery data processor 1 and of all the elements connected to the embroidery data processor 1. The CPU 7 executes the stitch data production process of FIGS. 5 and 6, data of which is stored in the ROM 9.

With the above-described structure, the embroidery data processor 1 operates as described below.

When the embroidery data processor 1 is started up, the CPU 7 is controlled to execute the stitch data production program code of FIGS. 5 and 6 prestored in the ROM 9. As a result, the embroidery data processor 1 is brought into a condition capable of performing various functions for processing embroidery data.

Figure 7:
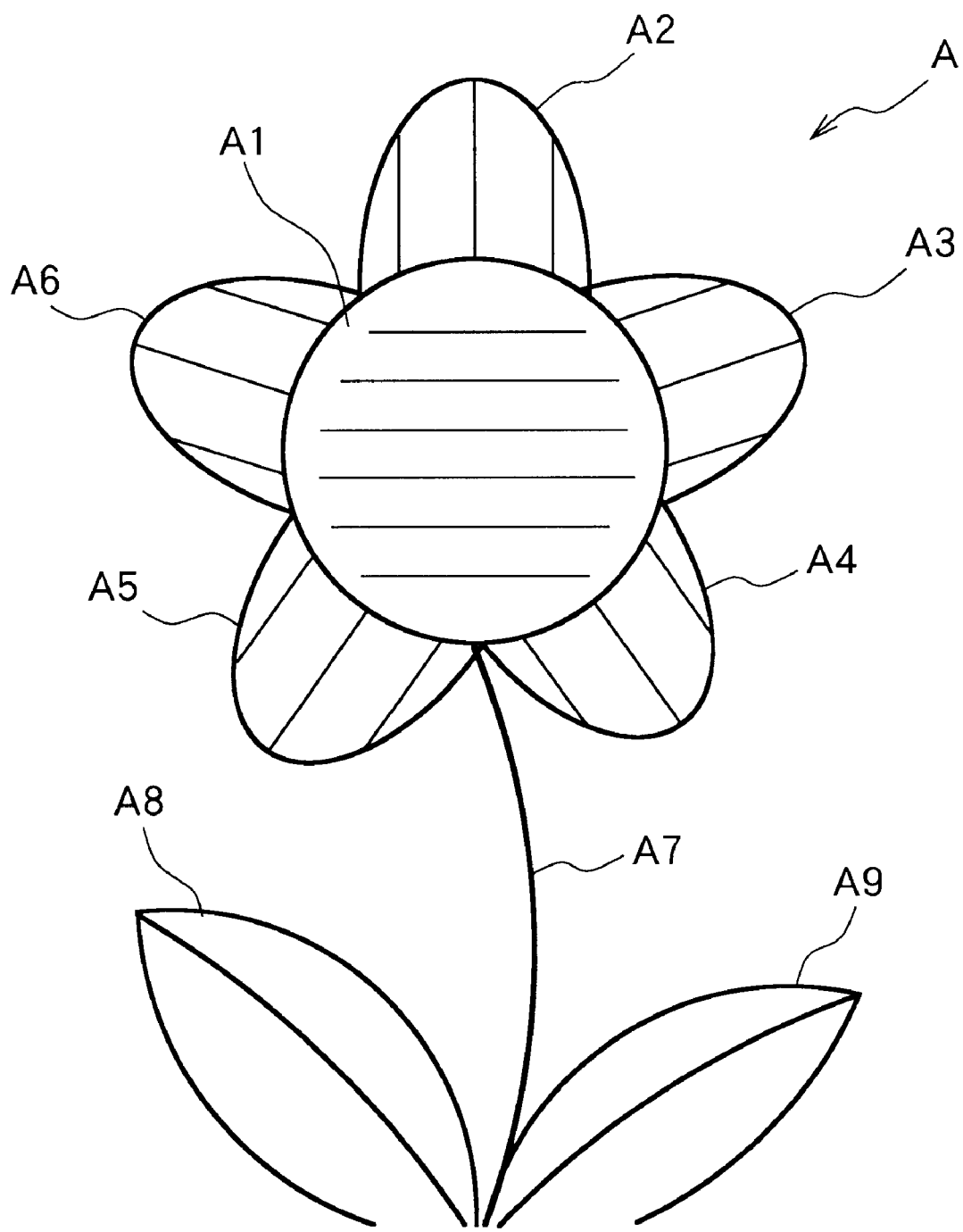
FIG. 7 illustrates one example of an image desired to be sewn as an embroidery.

Following descriptions are given for an example where the embroidery data processor 1 is used to produce embroidery data for the flower pattern A of FIG. 7.

When the computer of the embroidery data processor 1 is turned ON, the program of FIG. 5 is started. The user manipulates the image scanner 4 to scan the original image (flower pattern A of FIG. 7) desired to be sewn as an embroidery pattern. Accordingly, when the program of FIG. 5 is started, the CPU 7 controls in S1 the image scanner 4 to retrieve image data I from the original image A, and receives the image data I from the image scanner 4. In this example, the original image A is a black and white image as shown in FIG. 7. The image scanner 4 is of a monochromatic type for producing image data I in the form of bilevel bit-map data for each picture element on the original image A. The image data I is temporarily stored in the original image memory region 8a of the RAM 8.

As described already, the flower image A has the flower center region A1 and the five petal regions A2–A7. The flower center region A1 has its own texture characteristic. That is, a plurality of horizontally-extending lines appear in the inside area of the region A1. Embroidery stitch data is desired to be prepared for the region A1 so that horizontally-extending thread stitches will fill the inside area of the flower center A1.

Each flower petal region A2–A6 has its own texture characteristic, too. That is, a plurality of lines appear in the inside area of each region A2–A6 to extend radially outwardly from the flower center region A1. Embroidery stitch data is therefore desired to be prepared for each region A2–A6 so that radially outwardly-extending thread stitches will fill the inside area of each flower petal region A2–A6.

After completely retrieving the image data I from the original image A in S1, the program proceeds to S2 where the CPU 7 performs preparatory processes on the image data I now stored in the RAM 8. That is, the CPU 7 converts the image data I into a form that can be easily processed into embroidery stitch data. Representative examples of the preparatory processes include: predetermined binarization processes, predetermined color reduction processes, predetermined boundary extraction processes, predetermined region extraction processes, and the like. Those preparatory processes are well known, and therefore description of them are omitted.

Then, the program proceeds to S3, where a region selection process is executed. During the region selection process, the user selects, from the entire original image A, an image region which is desired to be embroidered with stitches in a single stitching direction that corresponds to the texture appearing in the inside of the image region.

This region selection process of S3 will be described below in greater detail.

Figure 8:
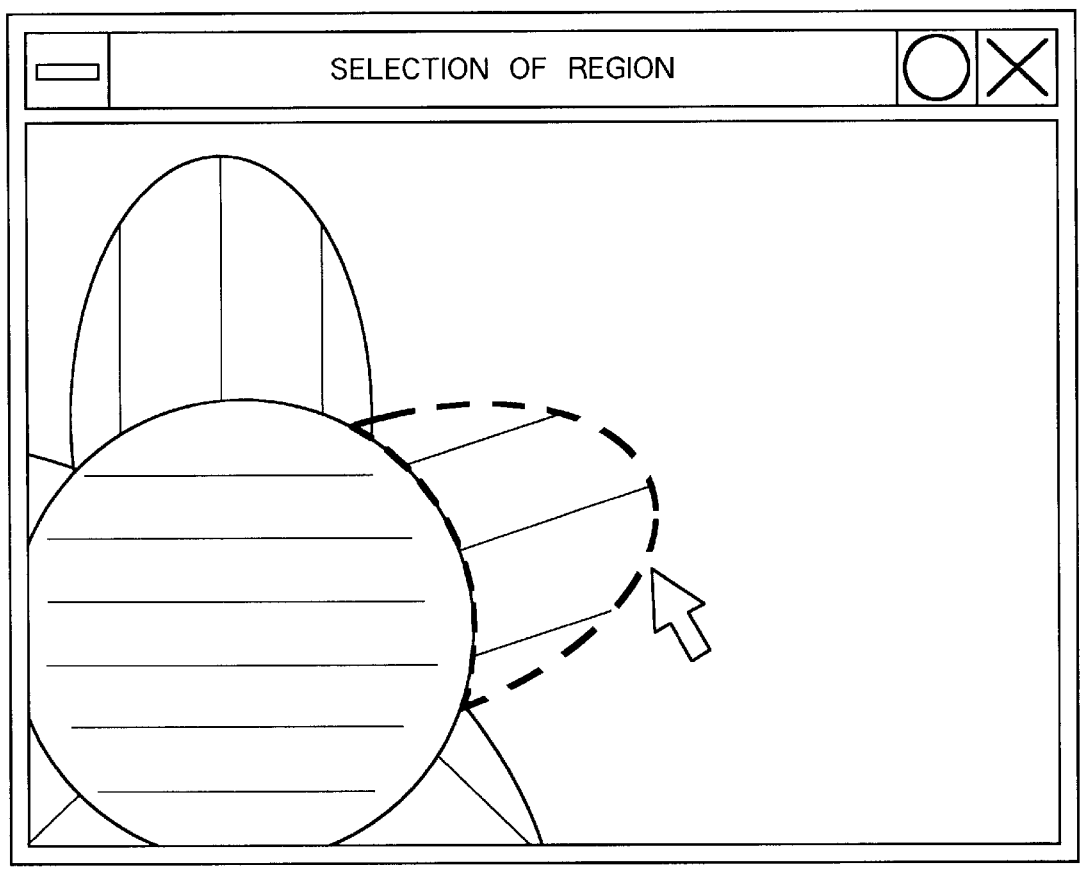
FIG. 8 illustrates one example of a region selection screen displayed during a region selection process in the embroidery stitch data production process of FIG. 5.

The CPU 7 controls the display 6 to show a region selection screen as shown in FIG. 8. On the region selection screen, the display 6 displays the original image A based on the image data I stored in the RAM 8. While viewing the region selection screen, the user manipulates the mouse 2 or the keyboard 3 to trace the periphery of his/her desired region. Thus, the user designates a region he/she desires to sew with stitches in a single direction that corresponds to the texture characteristic in that region.

In this example, as shown in FIG. 8, the user traces the periphery of one flower petal region (A3), which is desired to be sewn with stitches in the single direction that corresponds to the orientation of the lines residing in that region (A3).

Next, the program proceeds to S4. In S4, the CPU 7 performs a texture characteristic calculation process onto the region selected in S3. More specifically, the CPU 7 regards the texture appearing in the selected region (A3, in this example) as a two-dimensional function distributed on a two-dimensional plane. The CPU 7 then calculates texture characteristic data indicative of characteristic of the texture appearing inside the selected region. The CPU 7 calculates the texture characteristic data through calculating a power spectrum indicative of a strength of a spatial frequency of the texture (lines) appearing in the selected region. The calculated texture characteristic data indicates the orientation or direction of the lines appearing in the selected petal region A3. The CPU 7 then stores the calculated texture characteristic data in the texture characteristic memory 8b as a stitch direction parameter for the selected region.

Details of the texture characteristic calculation process of S4 will be described below with reference to FIG. 6.

First, in S41, the CPU 7 defines, based on the image data I, a two-dimensional function f(i, J) indicative of the texture appearing in the inside of the selected region A3. The function f(i, j) has a value equal to the value of the image data I for each picture element position (i, j) located inside the selected region A3. Then, the CPU 7 subjects the function f(i, J) to Fourier transformation with using the following formula:

$$F(u, v) = \int_{-\infty}^{\infty}\int_{-\infty}^{\infty} f(x, y) \cdot e^{-j2\pi(ux+vy)} dx\, dy$$

wherein f(x, y) is the function indicative of the texture appearing in the selected image region; and F(u, v) is a Fourier transform of the function f(x, y). Thus, the texture in the selected region A3 is subjected to the Fourier transform operation.

Next in S42, power spectrum P(u, v) of the Fourier transform F(u, v) is calculated through the following formula:

$$P(u, v) = |F(u, v)|^2$$

Figure 9:
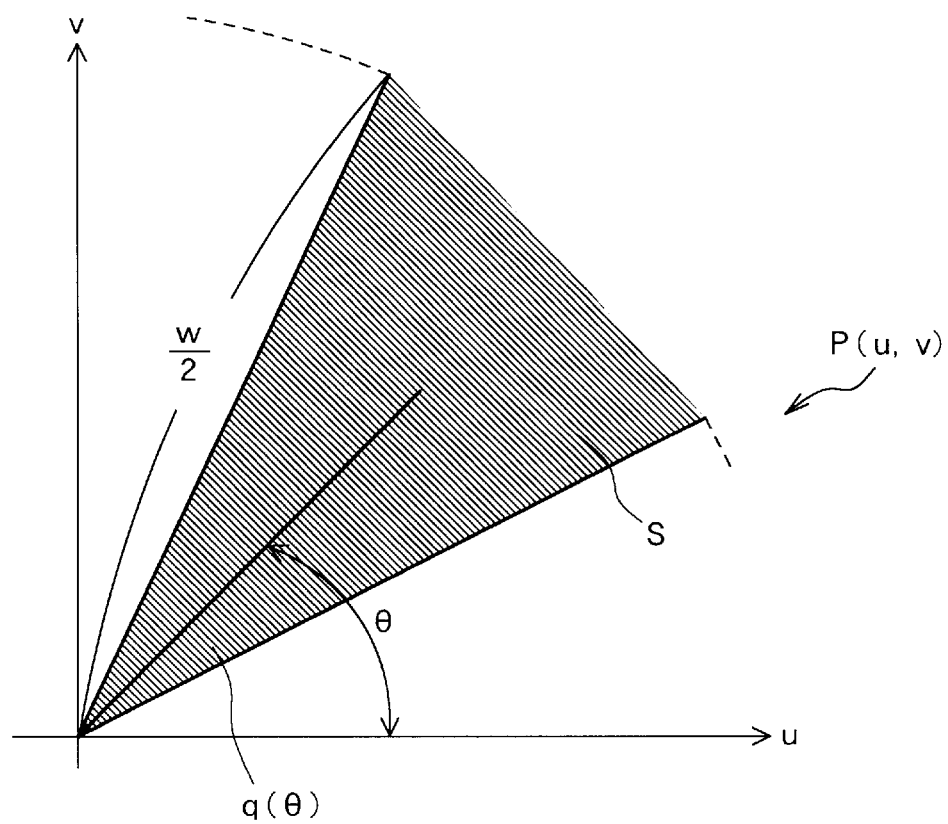
FIG. 9 illustrates how power spectrum is distributed in a Fourier transform plane.

The power spectrum P(u, v) is spread on a Fourier transform plane (u, v) as shown in FIG. 9, for example.

Next in S43, the power spectrum P(u, v) is converted into a polar coordinate system P(r, θ).

where $r = (u^2 + v^2)^{1/2}$ and $\theta = \tan^{-1} v/u$

Next in S44, texture characteristic is extracted through calculating the following formula:

$$q(\theta) = \sum_{r=0}^{w/2} P(r, \theta)$$

where w represents how the power spectrum P(u, v) spreads on the Fourier transform plane (u, v). That is, the power spreads on the Fourier transform plane (u, v) within a circle, which has its center located at the origin (0, 0) and which has a radius of "w/2" as indicated by a dotted line in FIG. 9. The value q(θ) represents a sum of power distributed inside a very small sector region S shown in FIG. 9 that is located within the power-distributed circular region and that is located at an angular position θ defined from the u-axis. The very small sector region S extends from the origin (0, 0) by the amount of "w/2" in the radius direction r and spreads by a very small amount in the angular direction θ.

It is noted that the value q(θ) changes as the angle θ changes. Texture appearing inside the selected region A3 has a specific characteristic at an orientation θ', which is at a right angle with respect to an angle θ max that causes its corresponding value q(θ max) to become maximum.

Figure 10:
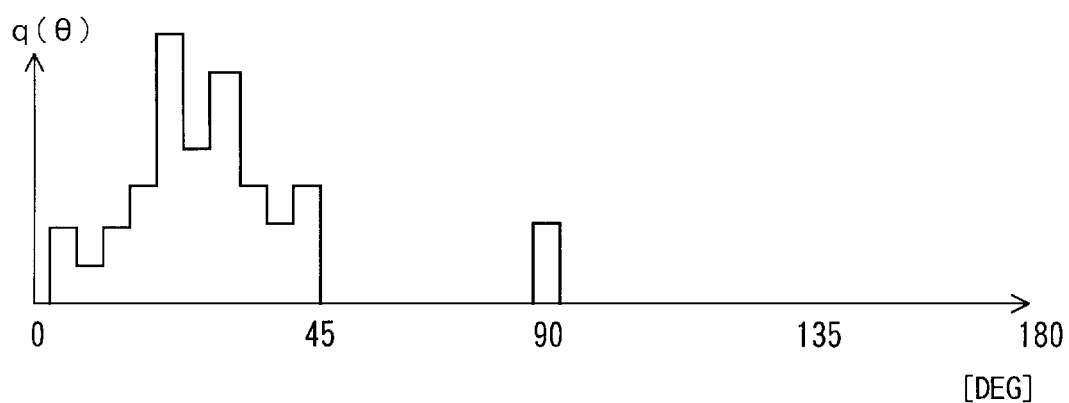
FIG. 10 illustrates a graph showing how a value $q(\theta)$ changes as a value $\theta$ changes.

Accordingly, in S45, the CPU 7 repeatedly calculates the value q(θ) while changing the value θ in a range of zero (0) degrees to 180 degrees, thereby obtaining a graph shown in FIG. 10. Then, the CPU 7 searches one single value θ max that allows the value q(θ max) to become maximum. Then, the CPU 7 calculates an angle θ', which is shifted from the value θ max by 90 degrees. The thus obtained angular value θ' represents the orientational characteristic of the texture in the selected region A3. In this example, the value θ' indicates the direction, in which the lines appearing in the region A3 extend. Data of the thus obtained value θ' is set in the characteristic data memory 8b as texture characteristic data (stitch direction parameter) for the selected region A3.

When the texture characteristic data θ' is thus obtained in S4 for the selected region A3, the program proceeds to S5 in FIG. 5. In S5, the CPU 7 controls the display 6 to show a message asking the user whether or not the user desires to again execute the processes of S3 through S5 for another region in the original image A. When the user desires to sew any other regions of the image A with stitches in directions corresponding to the textures appearing therein, the user inputs an instruction to again execute the processes of S3 through S5. When receiving this instruction, the CPU 7 performs an affirmative judgment in S6 (Yes in S6), and the program returns to S3. As a result, the processes of S3–S6 are again executed. That is, the operator selects another region desired to be sewn with stitches in a single direction specific to the texture residing therein. Then, texture characteristic data θ' is calculated in S4 for the presently-selected region, and is stored in the memory 8b. In this example, if the user selects another petal region (A4, for example), the CPU 7 calculates texture characteristic data θ' indicative of the orientation of the lines appearing in the region A4.

Thus, through repeatedly executing the processes of S3–S6, texture characteristic data θ' is calculated and stored successively for the user's selected regions. The texture characteristic data θ' for each of the user's selected regions indicates the direction, along which the lines residing in the each region extend.

When texture characteristic data θ' has been calculated and stored for all the user's selected regions, the user inputs his/her instruction not to execute the processes of S3–S6 any more. Accordingly, the judgment of S6 becomes negative ("No" in S6), and then the program proceeds to S7.

In S7, embroidery stitch data is produced for all the user's selected regions in a manner described below.

First, each of the user's selected region is divided into a proper number of triangular or quadrangular stitch zones. Then, coordinate values of each apex on those stitch zones are calculated. Next, the order of forming embroidery stitches for those stitch zones is determined. In this determined order, successive sets of stitch data are produced for each stitch zone. Details of the manner of producing the respective stitch zones and producing the successive sets of stitch data for each stitch zone are described in U.S. Pat. No. 4,413,574, the disclosure of which is hereby incorporated by reference.

According to the present embodiment, the successive sets of stitch data are produced according to: the stitch density parameter and the stitch type parameter stored in the ROM 9; and the stitch direction parameter (texture characteristic data) θ' calculated for the subject region and stored in the memory 8b. The successive sets of stitch data are produced to indicate coordinates of a plurality of needle points for forming thread stitches to fill in the interior of a corresponding stitch zone. The successive sets of stitch data are produced so that the thread stitches will be formed in a stitch type determined by the stitch type parameter, so that the thread stitches will be arranged in a stitch density determined by the stitch density parameter, and so that the thread stitches will extend in a direction determined by the stitch direction parameter (texture characteristic data) θ' calculated for the region where the subject stitch zone is located.

When the embroidery stitch data is produced for all the user's selected regions, the embroidery stitch data is appended with: thread color data; and color switch indication data for indicating to the user when thread is to be switched with another color.

In order to produce the thread color data, the CRT 6 is controlled to display a message reading "set a thread color for each of the selected regions" while displaying the original image A. The user manipulates the keyboard 3 or the mouse 2 to input data of his/her desired thread color. Based on the inputted color information, the CPU 7 produces thread color data indicative of the inputted thread color. Then, based on the thus produced thread color data, the CPU 7 produces the color switch indication data for indicating to the user when thread is to be switched with another color thread.

The thus produced thread color data and the color switch indication data are added to the embroidery stitch data in a form that the sewing machine 140 can retrieve and use for sewing an embroidery of the user's selected regions.

Then, the embroidery stitch data added with the thread color data and the color switch indication data is transmitted through the input/output interface 10 to the memory card connector 5. The memory card connector 5 writes the received data on the memory card 11, which is presently being mounted in the memory card connector 5. Thus, the memory card 11 is recorded with the embroidery stitch data, the thread color data, and the color switch indication data to be used for sewing an embroidery of the user's selected regions.

Thus, the embroidery data production process of FIG. 5 is completed.

It is now assumed that the user has selected the regions A1–A6 in S3 and therefore that embroidery stitch data is produced for those regions A1–A6. Thread color data is also produced to indicate color of a thread for sewing each of the regions A1–A6. Then, color switch indication data is produced based on the thread color data. The memory card 11 is recorded with the embroidery stitch data and the thread color data for the regions A1–A6 and the color switch indication data.

If the user desires to produce embroidery stitch data also for a remaining region of the original image A (portions A7–A9, in this example), the user may control the embroidery data processor 1 to execute a predetermined conventional embroidery stitch data production process, data of which is stored also in the ROM 9. During this conventional embroidery stitch data production process, the remaining region of the original image A is first divided into one or more sewing regions A7–A9, each of which is desired to be sewn with a single color. For example, the CRT 6 may display the original image A to enable the user to indicate the respective regions A7–A9. Then, embroidery stitch data is produced for each region in a manner similar to that executed in S7. That is, the CPU 7 produces embroidery stitch data for each region A7–A9 based on: the stitch density parameter and the stitch type parameter stored in the ROM 9; and a default stitch direction parameter, for example, which is stored in the ROM 9 as an appropriate stitch direction. The embroidery stitch data is then appended with thread color data and color switch indication data in the same manner as described above. The embroidery stitch data, the thread color data, and the color switch indication data are recorded in the memory card 11 in the same manner as described above.

The memory card 11 thus written with the embroidery stitch data and the like is mounted in the memory card device 143 of the embroidery sewing machine 140. When the user presses the start button 152, the embroidery sewing machine 140 starts sewing operation to sew an embroidery based on the embroidery stitch data stored in the memory card 11. In the embroidery sewing operation, first, the sewing machine 140 displays, on the display portion 146, a sewing region of the embroidery to be sewn first and a thread color set for the sewing region. Viewing the display 146, the user sets a thread of the indicated color on the needle 142. Then, the sewing machine 140 forms stitches to fill the inside area of the displayed region with the set thread. Following this sewing operation, the sewing machine 140 stops the needle 142. The sewing machine 140 then displays, on the screen 146, a sewing region next to be sewn, a thread color for that region, and a message requesting the user to change a needle thread. In response to this message, the user changes the current thread to the presently-indicated thread. Subsequently, the user re-starts the sewing machine 140 through manipulating the start button 152. As a result, the sewing machine 140 forms stitches to fill the presently-indicated region with the newly-set thread. Thus, one or more regions indicated by the embroidery stitch data are successively sewn with threads of corresponding colors.

It is noted that the embroidery stitch data is produced in S7 for the user's selected regions based on the texture characteristic data θ' calculated for those regions. Accordingly, the embroidery stitch data controls the sewing machine 140 to form thread stitches so that the thread stitches will extend on the cloth in the corresponding directions θ'. Those thread stitches will properly reproduce the textures in the user's selected regions.

In this example, the user has selected the regions A1–A6 in S3. Embroidery stitch data is produced in S7 for the region A1 at the stitch direction parameter θ' which is indicative of the horizontally-extending direction. Accordingly, the sewing machine 140 will produce an embroidery of the region A1 through forming horizontally-extending thread stitches filling therein. Embroidery stitch data is produced in S7 for each of the regions A2–A6 at the stitch direction parameter θ', which is indicative of the direction radially outwardly extending from the center region A1. Accordingly, the sewing machine 140 will produce an embroidery of each region A2–A6 through forming radially outwardly-extending thread stitches filling therein.

It is noted that through the above-described texture characteristic calculation processes of S4, it is possible to extract orientational characteristics of any types of textures appearing in the inside area of the selected region. In the above-described example, the selected petal region (A3, for example) has a plurality of linear lines formed therein. The obtained angular data θ' is therefore indicative of the direction in which those plurality of lines extend. Even when the selected region has other any types of textures, such as wave patterns, dotted patterns, and the like, if those patterns have certain orientational characteristics as capable of being perceived by human visual sense, those orientational characteristics can be extracted through the calculation processes of S4.

For example, if the selected region is formed with a plurality of dots which can be perceived by human visual sense as being arranged in some single direction, this direction can be determined as the directional value θ' through the calculation processes of S41–S45. Then, embroidery stitch data is produced in S7 to form stitches extending in the stitch direction determined based on the thus calculated pattern arrangement direction θ'. Accordingly, any types of patterns, whose directional characteristics can be perceived by human visual sense, can be reproduced by forming stitches to extend in the determined stitch direction θ'. Thus, any regions formed with any types of directional textures or patterns can be reproduced by stitches filling in the region at the corresponding stitch direction. Even though the texture or pattern appearing in each region is represented by more than one colors, the entire directional characteristic of the texture can be properly reproduced by the single color stitches that fill in the region at the corresponding stitch direction.

As described above, image data is retrieved in S1 by the image scanner 4 from the original image A desired to be sewn. In S3, the user selects one image region, where stitches are desired to be sewn in a single direction, from the retrieved image data. Texture characteristic data is then calculated in S4 for the selected region. In S7, the image data of each selected region is divided into a plurality of stitch zones, and stitch data is produced for each stitch zone.

While the invention has been described in detail with reference to the specific embodiment thereof, it would be apparent to those skilled in the art that various changes and modifications may be made therein without departing from the spirit of the invention.

For example, in the above-described embodiment, the CPU 7 automatically determines the single value θ max that causes the value q(θ) to become maximum. However, the CPU may select more than one values θ that cause their corresponding values q(θ) to become equal to or adjacent to the maximum value. The CPU 7 then controls the display 6 to show those more than one values θ as more than one candidates. The user selects, from the displayed more than one candidates, one value θ indicative of his/her desired stitch direction.

In the above-described embodiment, the texture characteristic data is calculated through calculating the power spectrum. However, the texture characteristic data can be obtained through calculating a co-occurrence matrix, differential statistical values, a run-length matrix, and the like.

In the above-described embodiment, the user manually selects in S3 one region desired to be sewn with stitches in the single direction. However, the CPU 7 may perform an automatic selection operation in S3 to automatically select one region that should be sewn with stitches in the same direction. In order to perform this automatic selection operation, the CPU 7 performs calculation operation in the preparatory processes of S2 to automatically divide the image data I into one or more regions in a manner described below.

First, the CPU 7 copies the image data I into another memory area prepared in the RAM 8. Then, the CPU 7 scans the copied image data CI, and judges whether or not the corresponding image has some small area regions, whose areas are equal to or lower than a predetermined threshold and therefore which are unnecessarily sewn. When the image has some small area regions, the CPU 7 modifies the image data CI through clearing data CI for the small area regions from the entire image data CI. Then, the CPU 7 divides the modified image CI into one or more single-color regions, each of which is formed with a single color (black or white, in this example). Then, the CPU 7 divides the original image I into the same one or more single-color regions.

During the repeatedly-executed routines of S3–S6, the CPU 7 will successively extract the single-color regions from the original image data I. Each of the thus successively-extracted single-color regions will be subjected in S4 to the texture calculation processes. Stitch data will be produced for each of the single-color regions so that each single-color region will be filled with thread stitches with each thread stitch extending in a direction θ' corresponding to the texture characteristic determined for the subject region.

In the above-described embodiment, the image scanner 4 is of the type that produces bilevel data I for each picture element. However, the image scanner 4 may be of another type that produces multilevel data ("0"–"255", for example) I for each picture element. When the image scanner 4 is of the multilevel type, it is preferable to modify the copied image data CI so that the image data CI will be made up from a less number of colors or density levels than the original data I. The thus color-reduced image data CI is subjected to the scanning operation, and then is divided into one or more single-color (i.e., single-density) regions.

The image scanner 4 may be of the full color type for scanning a full color image and for producing color image data I. Also in this case, it is preferable to modify the copied image data CI so that the image data CI will be made up from a less number of colors and density levels than the original data I. The thus color-reduced image data CI is subjected to the scanning operation, and then is divided into one or more single-color and density regions.

In the above-described embodiment, thread colors of the respective regions in the original image are manually set by the user. However, the thread colors can be automatically set by the processor 1 according to the color characteristic of the image data I obtained by the image scanner 4.

In the above-described embodiment, the stitch direction θ' is automatically determined for the selected region according to the characteristic of the texture or pattern residing in the selected region. However, other various stitch formats can be automatically determined according to the characteristic of the texture or pattern residing in the selected region. Representative examples of the stitch formats include: the stitch density; color of thread to be used; and a stitch type such as tatami stitches, satin stitches, etc. Those stitch formats may be determined for the user's selected region in accordance with the characteristic of the texture or pattern residing inside the subject region. For example, as in the above-described modification, colors of thread stitches to be filled in the selected region can be determined according to the color characteristic of the selected region. Other stitch formats may be determined according to other various characteristics of the texture residing in the inside area of the subject region.

According to the above-described embodiment, the ROM 9 in the embroidery data processor 1 is prestored with data of the stitch data production program of FIGS. 5 and 6. The program includes: the image input step of S1; the region selecting step of S3; the texture characteristic calculation step of S4, which includes the power spectrum calculation step of S42 and the stitch direction selection step of S45; and the stitch data production step (stitch format setting step) of S7. However, the embroidery data processor 1 according to the present invention is not limited to this situation. For example, the program data can be stored in the data storage medium 14, such as a floppy disk, and retrieved by the external storage device 13 in the embroidery data processor 1. The embroidery data processor 1 can then store the program data in its RAM 8 or a hard disk, for example. In this case, the program can be operated on any desired electronic devices such as personal computers.

Alternatively, the program can be retrieved from an external information processor using wireless or cable transmission, and then used to operate any desired computers.

Further, the program data can be stored in a variety of different types of recording media, such as a magnetooptical disk or a CD-ROM, that is suitable for the embroidery data processor.

In the above-described embodiment, the embroidery stitch data produced by the embroidery data processor 1 is written on the memory card 11. Alternatively, the embroidery data processor 1 may directly be connected via a data cable to the sewing machine 140, so that the embroidery stitch data produced by the processor 1 can directly be transferred to the control portion of the sewing machine 140. Otherwise, the processor 1 as a whole may be incorporated into the sewing machine 140.

According to the above-described embodiment and modifications, the embroidery data processor 1 can process embroidery stitch data for forming embroidery stitches based on any optional pattern images. The embroidery data processor 1 receives data of an image desired to be sewn as an embroidery. The embroidery data processor 1 automatically determines texture characteristic of the inputted image. The embroidery data processor 1 then sets the stitch format, such as the stitch sewing direction, based on the determined texture characteristic.

With this structure, embroidery stitch data can be produced from any pattern images so that texture characteristics, i.e., characteristics of the texture or pattern appearing inside the original image, can be automatically reflected to the embroidery stitches without requiring any inputs from the operator.

The embroidery data processor 1 operates to select an optional image region from the inputted image. The processor 1 calculates texture characteristic of each selected region. With this structure, characteristics of regions having different characteristics can be individually reflected to the stitch format (such as the stitch direction) of stitches to be formed in the corresponding embroidery regions.

The data processor 1 calculates the texture characteristic value. The data processor 1 then sets the stitch format (stitch direction) of stitches to be sewn in the selected region based on the texture characteristic value. In the above-described embodiment, the data processor 1 can automatically set the calculated texture characteristic value as the direction of stitch threads without requiring any inputs from the operator.

According to the above-described modification, the data processor 1 may be designed to calculate a plurality of different texture characteristic values for each selected region. The data processor 1 displays the plurality of texture characteristic values as a plurality of stitch direction candidates. The user selects one texture characteristic value from the plurality of stitch direction candidates. Based on the user's selection operation, the data processor 1 sets one stitch direction as appropriate for the user.

According to the above-described embodiment, the data processor 1 calculates a power spectrum indicative of a strength of spatial frequency of the selected image region. The power spectrum indicates the texture appearing in the inside area of the selected image region. The data processor 1 then calculates the texture characteristic value $\theta'$ based on the calculated power spectrum. Then, the data processor 1 sets the direction of stitch threads based on the texture characteristic value $\theta'$.

The data processor 1 produces embroidery stitch data indicative of stitches to be sewn in the thus determined stitch format such as the stitch direction. The embroidery stitch data will form stitches in the stitch format, such as the stitch direction, that properly corresponds to the texture characteristic of the original image.

According to the above-described modification, the data processor 1 as a whole may be incorporated into the sewing machine 140. With this structure, embroidery stitch data corresponding to the texture characteristic of the original image can be automatically prepared from the inputted image data, and then embroidery sewing with the embroidery stitch data is performed immediately.

What is claimed is:

1. An embroidery data processing device for processing embroidery stitch data for forming embroidery stitches based on a desired pattern image, the embroidery data processor comprising:

image input means for inputting an image desired to be sewn as an embroidery;

texture calculation means for determining a texture characteristic of the inputted image; and stitch format setting means for setting a stitch format, in which stitches are to be formed to reproduce the input image, based on the determined texture characteristic.

2. An embroidery data processing device as claimed in claim 1, wherein the texture calculation means automatically calculates the texture characteristic indicative of a characteristic of a texture appearing in the inputted image.

3. An embroidery data processing device as claimed in claim 2, further comprising stitch data production means for producing embroidery stitch data indicative of stitches to be sewn in the determined stitch format.

4. An embroidery data processing device as claimed in claim 3, wherein the stitch format setting means sets, based on the determined texture characteristic, a stitch direction, in which stitches are to be formed to extend to reproduce the texture of the input image, the stitch data production means producing embroidery stitch data indicative of stitches to be sewn to extend in the determined stitch direction.

5. An embroidery data processing device as claimed in claim 1, further comprising region selecting means for selecting a region of the inputted image, the texture calculation means calculating the texture characteristic of the selected region.

6. An embroidery data processing device as claimed in claim 5, wherein the region selecting means allows a user to select a region, of the inputted image, desired to be sewn to reproduce the texture characteristic of the region.

7. An embroidery data processing device as claimed in claim 6, wherein the stitch format setting means includes:

calculation means for calculating a characteristic value indicative of the determined texture characteristic; and format setting means for setting the stitch format based on the calculated characteristic value.

8. An embroidery data processing device as claimed in claim 7, wherein the calculation means calculates at least one characteristic value based on the determined texture characteristic, the format setting means setting at least one stitch format based on the at least one characteristic value, wherein the stitch format setting means further includes stitch format selection means for selecting a desired stitch format from the at least one stitch format.

9. An embroidery data processing device as claimed in claim 8, wherein the stitch format selection means causes a user to select his/her desired stitch format from the at least one stitch format.

10. An embroidery data processing device as claimed in claim 5, wherein the stitch format setting means includes:

calculation means for calculating a characteristic value indicative of the determined texture characteristic; and direction setting means for setting a stitch direction, in which stitches are to be formed to extend in the selected region, based on the calculated characteristic value.

11. An embroidery data processing device as claimed in claim 10, wherein the calculation means calculates a plurality of characteristic values based on the determined texture characteristic, the direction setting means setting a plurality of stitch directions based on the plurality of characteristic values, wherein the stitch format setting means further includes stitch direction selection means for selecting a desired stitch direction from the plurality of stitch directions.

12. An embroidery data processing device as claimed in claim 11, wherein the stitch direction selection means causes a user to select his/her desired stitch direction from the plurality of stitch directions.

13. An embroidery data processing device as claimed in claim 2, wherein the texture calculation means includes power spectrum calculation means for calculating, as the texture characteristic, a power spectrum indicative of a strength of spatial frequency of the texture in the input image.

14. An embroidery data processing device as claimed in claim 13, wherein the stitch format setting means includes:

calculation means for calculating a characteristic value indicative of directional characteristic of the determined power spectrum; and direction setting means for setting a stitch direction, in which stitches are to be formed to extend in the selected region, based on the calculated characteristic value.

15. An embroidery data processing device as claimed in claim 14, further comprising stitch data production means for producing embroidery stitch data, indicative of stitches to be sewn in the determined stitch direction.

16. An embroidery data processor as claimed in claim 15, further comprising a sewing portion for performing embroidery sewing with the produced embroidery stitch data.

17. A sewing machine capable of sewing an embroidery based on a desired pattern image, the sewing machine comprising:

image input means for inputting an image desired to be sewn as an embroidery;

texture calculation means for automatically determining a texture characteristic of the inputted image;

stitch format setting means for setting a stitch format based on the determined texture characteristic;

stitch data production means for producing embroidery stitch data indicative of stitches to be sewn in the determined stitch format; and sewing means for sewing an embroidery based on the produced embroidery stitch data.

18. A method for processing embroidery stitch data for forming embroidery stitches based on a desired pattern image, the method comprising the steps of:

inputting an image desired to be sewn as an embroidery;

determining a texture characteristic of the inputted image; and setting a stitch format, in which stitches are to be formed to reproduce the input image, based on the determined texture characteristic.

19. A method as claimed in claim 18, wherein the texture determining step calculates the texture characteristic indicative of a characteristic of a texture appearing in the inputted image.

20. A method as claimed in claim 19, further comprising the step of producing embroidery stitch data indicative of stitches to be sewn in the determined stitch format.

21. A method as claimed in claim 20, wherein the stitch format setting step sets, based on the determined texture characteristic, a stitch direction, in which stitches are to be formed to extend to reproduce the texture of the input image, the stitch data production step producing embroidery stitch data indicative of stitches to be sewn in the determined stitch direction.

22. A data storage medium storing data of a program for processing embroidery stitch data for forming embroidery stitches based on a desired pattern image, the data storage medium being capable of being read by a computer, the program comprising programs of:

inputting an image desired to be sewn as an embroidery;

determining a texture characteristic of the inputted image; and setting a stitch format, in which stitches are to be formed to reproduce the input image, based on the determined texture characteristic.

* * * * *